United States Patent
Ganguli et al.

(10) Patent No.: US 10,700,375 B2
(45) Date of Patent: Jun. 30, 2020

(54) BIOHYBRID FUEL CELL AND METHOD

(71) Applicant: Teledyne Scientific & Imaging, LLC, Thousand Oaks, CA (US)

(72) Inventors: Rahul Ganguli, Oak Park, CA (US); Payam Minoofar, Ventura, CA (US); Pavan Narain Mehrotra, Simi Valley, CA (US); Peter Malati, Hawthorne, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 0 days.

(21) Appl. No.: 15/229,852

(22) Filed: Aug. 5, 2016

(65) Prior Publication Data
US 2017/0054171 A1 Feb. 23, 2017

Related U.S. Application Data

(60) Provisional application No. 62/201,984, filed on Aug. 6, 2015.

(51) Int. Cl.
*H01M 8/16* (2006.01)
*H01M 8/0612* (2016.01)
*H01M 8/1011* (2016.01)

(52) U.S. Cl.
CPC .......... *H01M 8/16* (2013.01); *H01M 8/0631* (2013.01); *H01M 8/1011* (2013.01); *Y02E 60/522* (2013.01); *Y02E 60/523* (2013.01); *Y02E 60/527* (2013.01)

(58) Field of Classification Search
CPC ..... H01M 8/0631; H01M 8/1011; H01M 8/16
See application file for complete search history.

(56) References Cited

U.S. PATENT DOCUMENTS

| | | | |
|---|---|---|---|
| 5,736,026 A * | 4/1998 | Patel | H01M 8/06 205/343 |
| 2007/0218338 A1* | 9/2007 | Imura | H01M 8/04201 429/447 |
| 2008/0171256 A1* | 7/2008 | Kang | H01M 8/023 429/447 |
| 2009/0017512 A1* | 1/2009 | May | C12M 21/12 435/165 |
| 2009/0047567 A1* | 2/2009 | Sakai | C12Q 1/001 429/401 |
| 2013/0029242 A1* | 1/2013 | Mizuhata | H01M 8/04291 429/442 |

FOREIGN PATENT DOCUMENTS

CN 103060150 A * 4/2013 ............... C12G 3/02

OTHER PUBLICATIONS

Machine Translation CN103060150(A) (Year: 2013).*

* cited by examiner

*Primary Examiner* — Victoria H Lynch
(74) *Attorney, Agent, or Firm* — Glen H. Lenzen; Dietze and Davis, P.C.

(57) ABSTRACT

A biohybrid dual chamber fuel cell and method for producing sustainable electrical power from unprocessed biomass include a microbial fuel cell (MFC) for processing the biomass into a clean fuel, a direct alcohol fuel cell (DAFC) operatively connected to the microbial fuel cell for oxidizing the clean fuel to generate electrical power and a separation barrier in the form of a reverse osmosis membrane disposed intermediate the MFC and the DAFC which prevents the diffusion of impurities from the MFC into the DAFC and the return flow of oxidation by-products from the DAFC into the MFC.

21 Claims, 6 Drawing Sheets

BIOHYBRID FUEL CELL AND METHOD

CROSS-REFERENCE TO RELATED APPLICATIONS

This application claims the benefit of U.S. Provisional Patent Application Ser. No. 62/201,984, filed on Aug. 6, 2015, and entitled Biohybrid Fuel Cell and Method, the entire disclosure of which is incorporated herein by reference.

RIGHTS OF THE U.S. GOVERNMENT

This invention was made with Government support under Contract No. W911NF-08-R-006 awarded by the Department of Defense (DOD) on behalf of the Army Research Office. The Government has certain rights in the invention.

FIELD OF THE INVENTION

The present invention relates to fuel cells. More specifically, the present invention relates to a hybrid dual chamber fuel cell for generating electrical power having a sustainable high power density from biomass fuels.

BACKGROUND OF THE INVENTION

Fuel cell technology shows great promise as an alternative energy source for diverse applications. Fuel cells convert chemical energy released during an electrochemical reaction in a reaction chamber which includes a positive electrode or cathode, a negative electrode or anode, an electrolyte which transports electrically charged particles from one electrode to the other, a catalyst which accelerates the chemical reactions at the electrodes and a fuel. The key element of fuel cell operation regardless of the type is the flow of the appropriate ions between the cathode and the anode. If free electrons or other substances pass through the electrolyte, they may foul the catalyst, collect on the electrodes or otherwise disrupt the chemical reaction, thereby causing the power output of the fuel cell to fall off or stop completely.

Various types of fuel cells have been developed and are known generally by their function, structure or the fuel source. Examples include proton exchange membrane (PEM) fuel cells, also known as polymer electrolyte membrane fuel cells (PEMFC), direct methanol fuel cells (DMFC), direct alcohol fuel cells (DAFC), and microbial fuel cells (MFC), to name a few. Fuel cells are of particular interest in the renewable energy field inasmuch as they present potential sources of power which do not rely upon fossil fuels in their operation.

Renewable sources of energy are critical to reduce the impact of global warming and to meet the world's future energy demands. A sustainable and renewable energy source will preserve the environment and decrease dependence on foreign sources of oil. However, finding an economical and efficient way to produce energy from a renewable source has been elusive. Energy produced from biomass can meet this critical challenge, and its ubiquitous nature makes biomass attractive for widespread use as a fuel, provided that energy production based thereon as a fuel source may be accomplished in an economical and efficient manner. However, thus far, technologies which have been developed to convert biomass into energy have proven to be either inefficient or uneconomical, and the sustainable power output level of fuel cells in general has been disappointing.

For example, Halme et al., in European Patent Application No. EP 1 376 729 A2 for Biocatalytic Direct Alcohol Fuel Cell published on Jun. 13, 2003 (the '729 application), disclose a biocatalytic fuel cell which addresses the problems associated with limited power output in both hybrid fuel cells, where one of the electrodes is substantially chemical and the other substantially biocatalytic, and completely biocatalytic fuel cells. These problems stem from the mild operating conditions necessary to sustain the enzymatic catalyst, a live microorganism, in either the anode or the cathode reaction chamber. As noted in the Halme disclosure, chemical, direct-acting fuel cells require intensive reaction conditions such as high temperatures and strongly acidic or alkaline solutions as well as an expensive platinum secondary catalyst to achieve any appreciable power output. These conditions are not conducive to the survivability of the enzymatic catalyst. Halme and his colleagues address this problem by providing a direct alcohol fuel cell which has an anode chamber and one or more cathode chambers and uses a so-called "triplet" in which a biocatalyst oxidizes fuel in the anode chamber and cooperates with a mediator to convey the generated electrons to a current collector electrode. Oxygen or corresponding oxidants are reduced in the cathode chamber by means of electrons originating from a current donor electrode and a chemical or biocatalyst (or a combination thereof). While the '729 application discusses certain prior art references to the use of human fluids or plant sap as the fuel source, alcohol is the fuel required in the operation of the disclosed system.

More recently, U.S. Patent Application Publication No. 2008/0274393 A1 for Hydrogel Barrier for Fuel Cells published by Markoski et al. on Nov. 6, 2008, (the '393 application") discloses a fuel cell that includes a system for reducing the amount of water at or within the cathode and to prevent the occurrence of "fuel crossover", both of which reduce the electrical output of the fuel cell. "Fuel crossover" is a situation where the fuel crosses through the membrane in the cell designed to separate the anode from the cathode and reacts with the catalyst directly in the presence of oxygen to generate heat, water and carbon dioxide but no useable electric current. While the Markoski et al. application discloses the use of an aqueous liquid and a polymer positioned intermediate the anode and the cathode to maintain the separation of liquids surrounding the respective electrodes (in this case methanol and water) in a direct methanol fuel cell (DMFC), limited output is obtained from a non-biomass fuel source.

The use of biomass, material derived from plants, is a highly attractive alternative to fossil fuels. The direct conversion of biomass to electricity is receiving considerable attention due to improved overall efficiencies and reduced generation of greenhouse gaseous byproducts. Although biomass is readily available everywhere, extensive processing is required before it can be used in any modern system to extract power. An example is the combustion of biomass to convert water to steam, which then performs mechanical work to spin a turbine to generate electrical power. It is a three-step process: combustion of biomass in boilers to generate steam, conversion of the heat energy in steam to mechanical work in turbines, and finally, use of rotary generators to produce electricity. Thermodynamic losses during the three conversion steps limit the overall efficiency of conversion to a range of approximately 20% to 40%; although, higher efficiencies may be achievable for large systems (>100 MW of electrical power).

Other known processes for the derivation of energy from biomass include gasification, pyrolysis, and anaerobic digestion. Gasification can be up to 50% efficient when combined with a heating recovery system but is uneconomical due to elaborate process requirements. Pyrolysis, the conversion of biomass to fuel only, can be up to 80% efficient, but the overall conversion efficiency to electricity is less than 20%. Distillation processes, another example, can consume about a third of the total chemical energy in the biofuel. If the energy lost during distillation can be avoided and the biofuel can be converted to electricity at efficiencies of 40%-50% in fuel cells, then direct conversion of fermenting biomass to electricity becomes a compelling option. Even gas-to-electricity generators, which use biogas directly, are only 30% efficient, exclusive of the losses in the conversion of biomass to biogas. Conversion efficiencies are even lower when wet biomass with high water content is used due to the additional energy required to drive out the moisture. The existing processes also release environmentally harmful gases, including ammonia, carbon monoxide, formaldehyde, nitrogen oxides, hydrocarbons, and sulfur oxides. Anaerobic digestion is only 10% to 16% efficient when electricity is the desired end product, but wet biomass with higher water content may be used. It also results in the production of unpleasant and harmful gases, making it unacceptable for wider deployment.

In each of the aforementioned technologies, direct electrical power from biomass is not produced, and the overall efficiency is drastically reduced due to intermediate energy conversion processes that must be used. Currently, it is more cost effective to burn fossil fuels to produce electricity than to use biomass in the form of waste or plant matter. Therefore, the key to making biomass and derived biofuels a compelling source of electrical power with wide acceptance is to produce power directly from biomass with minimal processing, high efficiency, low cost, and minimal harmful emissions.

One technology capable of producing electrical power directly from biomass with little to no preprocessing is a fuel cell. The potential of directly converting biological fuels to electrical energy using inexpensive, self-sustaining microbial catalysts make Microbial Fuel Cells (MFCs) attractive for persistent energy harvesting. Another key advantage for biomass electro-oxidation, especially using proton exchange membrane (PEM) fuel cells, is the generation of valuable co-products that can enable the economics of the overall process. For example, while research is continually driving to more efficient fuel cell catalysts in direct ethanol fuel cells (DEFCs), residual acetic acid could still be a useful commodity (i.e., in de-icing).

Typically, a significant amount of processing is required before biofuels can be utilized in fuel cells. For example, fermentation is often used to produce ethanol, which, as noted above, when combusted to produce electricity, is a highly inefficient process due to intermediate steps involving other types of energy. This processing includes purification steps to eliminate foulants in the fuel, which can kill the fuel cell power output in a relatively short time. Moreover, pure fuels (such as neat ethanol) are not used in PEM fuel cells due to large crossover-related losses, which Markoski et al. attempt to address in their work disclosed in the '393 application discussed above. Dilution is necessary and a fuel delivery system is needed, which adds to the size, parasitic energy requirement, and the cost of the overall system.

Direct conversion of biomass to electricity without feed purification or dilution can be achieved using a microbial fuel cell (MFC). Allen and Bennetto showed that MFCs utilizing mediators (i.e., 2-hydroxy-1,4-naphthoquinone) to shuttle electrons from *Proteus vulgaris* to the anode from culture broth generate ~10 $\mu W\ cm^{-2}$ power at coulombic efficiencies of ~30%. Allen, R. and Bennetto, P., *Microbial Fuel Cells*, Appl. Biochem. Biotechnology, 39-40, 27-44 (1993). Chaudhuri and Lovley showed that MFCs utilizing anode respiring bacteria, which do not require mediators, generate <10 $\mu W\ cm^{-2}$ at coulombic efficiencies>80% via direct electron transfer. Chaudhuri, S. K., Lovley, D. R., *Electricity Generation by Direct Oxidation of Glucose in Mediatorless Microbial Fuel Cells*, Nature Biotechnology 21, 1229-1232 (2003). Although much work has been done to increase the power densities of such MFCs, power output levels in excess of approximately 100 $\mu W\ cm^{-2}$ have not yet been achieved.

Direct utilization of products from microbial metabolism in DEFCs to generate approximately 900 $\mu W\ cm^{-2}$ in a single step has been reported. Mackie, D. M., Liu, S., Benyamin, M., Ganguli, R., Sumner, J. J., *Direct Utilization of Fermentation Products in an Alcohol Fuel Cell*, J. Power Sources 232, 34-41 (2013). Although the coulombic efficiency of these biofuel cells are limited, since conversion of sugars were limited only to acetic acid and not completely to carbon dioxide, the much higher power densities may enable practical applications and represent an exciting step forward. A critical technical challenge is the design of effective microbial growth media to minimize the presence of organics, salts, proteins, and other species in the fermentation broth that interfere with, or foul, the catalyst or the membrane electrode assembly (MEA). Consequently, high power densities achieved initially declined over time. However, if foulants could be separated from the products of microbial metabolism to prevent power decline, then the conversion of simple sugars to electricity would be compelling.

In view of the foregoing, it will be apparent to those skilled in the art from this disclosure that a need exists for an improved reverse osmosis (RO) membrane-integrated DEFC that (a) eliminates the fouling problem of such fuel cells, allowing the use of dirty biomass as fuel, and (b) minimizes crossover-related losses by passively regulating the concentration of ethanol in the DEFC. Moreover, a need exists for an improved method of generating electrical power in fuel cells using biomass fuel sources without the need for intermediate, efficiency-reducing processing steps associated with the conversion of biomass into suitable fuels.

SUMMARY OF THE INVENTION

In order to achieve the above-mentioned objectives and other objects of the present invention, a hybrid, integrated fuel cell is provided having a Microbial Fuel Cell (MFC), or fermentation chamber in the absence of an MEA in the MFC, for producing a suitable fuel, the MFC/fermentation chamber being coupled to a Direct Alcohol Fuel Cell (DAFC) which oxidizes the fuel for power generation.

In one embodiment of the present invention, fermentation carried out in a MFC/fermentation chamber produces clean non-fouling ethanol from an impure biomass fuel source containing sugars, such as glucose, which diffuses across a reverse osmosis membrane into the anode chamber of a DAFC where it is oxidized to produce electricity.

In an embodiment, the osmotic pressure in the MFC/fermentation chamber is balanced by dissolving an osmotic balancer, for example a sugar (by way of example, not limitation), in the anode chamber to achieve forward osmosis across the RO membrane of a clean fuel that does not foul the DAFC MEA.

In another embodiment, a method is provided which utilizes a dirty or impure unprocessed biomass fuel source material to produce electricity at sustainably high power levels in a fuel cell without fouling the MEA and diminishing the electrical output capability of the fuel cell.

These and other features of the present invention will become apparent to those skilled in the art from the following detailed description of preferred embodiments taken in conjunction with the accompanying drawings, figures and tables and by reference to the appended claims.

BRIEF DESCRIPTION OF THE DRAWINGS

Referring now to the attached drawings which form a part of this original disclosure all membrane integrated fuel cells using ethanol and unprocessed biomass will be referred to as hybrid and biohybrid fuel cells, respectively:

FIG. 3.B. is a graphical presentation of potential and power density measured in a fuel cell using a full growth medium which illustrates output reduction in excess of a factor of 2.

FIG. 7.B. compares the power densities and discharge capacities of a DEFC and a biohybrid DEFC using fermented grape (wine) and a DGFC as a control.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
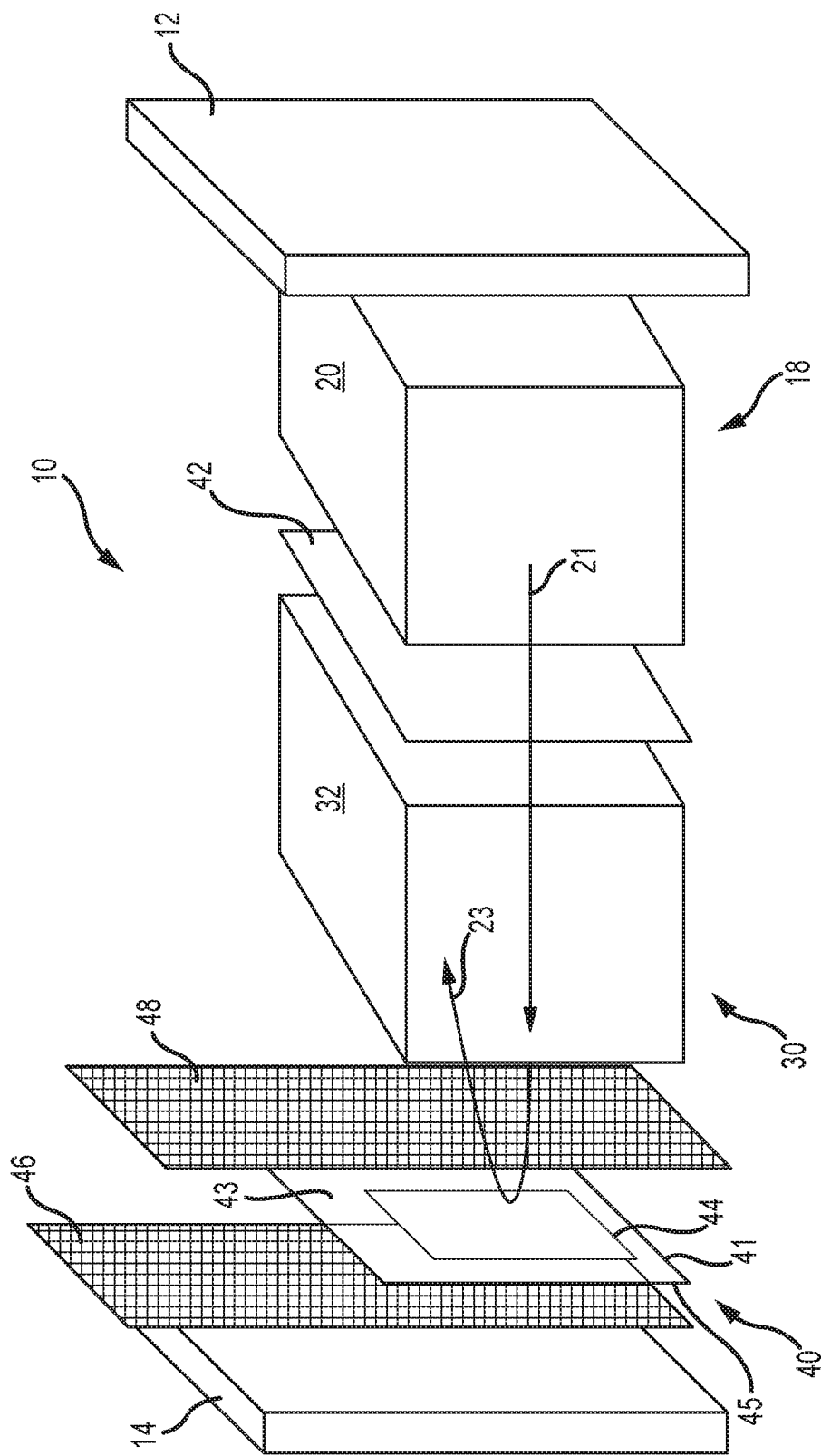
FIG. 1 is an exploded side perspective view of a hybrid, integrated dual chamber fuel cell in accordance with an embodiment.

Referring now to FIG. 1, a hybrid, integrated dual chamber fuel cell is shown generally at 10. For purposes of simplicity, the fuel cell 10 will be referred to herein from time to time as the biohybrid fuel cell, hybrid fuel cell or simply the fuel cell without limiting the scope of the present invention. Fuel cell 10 includes a pair of oppositely disposed end plates 12, 14 forming the end portions of a container or housing. The housing also includes oppositely disposed top and bottom members and a pair of oppositely disposed side members which cooperate with the end plates to form the container. The components forming the fuel cell container or housing are made of a polycarbonate material; however, other materials may be used without departing from the scope of the present invention. The top, bottom and side members have been removed from the drawing to better illustrate the components of the fuel cell of the present invention.

The hybrid fuel cell 10 includes a microbial fuel cell (MFC) 18 having a fermentation chamber 20 operatively connected to a direct alcohol or direct ethanol fuel cell (DAFC or DEFC) which includes an anode chamber shown generally at 30 which includes a reservoir 32, and a membrane electrode assembly (MEA) 40 positioned within the anode chamber. An active fermentation process takes place in the MFC/fermentation chamber that converts an unprocessed biomass fuel source or fermentation broth into an alcohol, for example, ethanol. It is to be understood that a MFC may also be used to generate electrical power; however, in accordance with the novel features of the present invention, the fuel generated from the fermentation broth in the MFC is transferred to the DEFC as will be described in greater detail below. By way of example and not of limitation, the fermentation broth may be comprised of a nutrient such as glucose or some other form of sugar and microbes such as yeast which are held in the chamber under conditions conducive to the fermentation of alcohol. More complex microbial consortia in combination with catalyst systems or genetically modified organisms that can convert more complex sugars into fermentable sugars may also be used. A separation or reverse osmosis (RO) membrane 42 is disposed intermediate the MFC/fermentation chamber 20 in the MFC and the anode chamber 30 in the DAFC. The MFC/fermentation chamber and the anode chamber are osmotically balanced with respect to one another across the RO membrane and cooperate therewith to facilitate diffusion of the pure fermented ethanol in the direction of arrow 21 across the membrane from the MFC/fermentation chamber into the anode chamber. The foulants (such as organic compounds, salt, acids, proteins and other materials which do not contribute to the reaction) contained in the untreated broth or generated during the course of the fermentation process are prevented from diffusing into the anode chamber by the RO membrane and remain in the MFC/fermentation chamber. Similarly, acetate, which is formed during the reaction process in the anode chamber is prevented from returning to the MFC/fermentation chamber 20 in a direction indicated by arrow 23 by the RO membrane 42.

As discussed below and shown in greater detail in FIG. 2, the membrane electrode assembly or, for convenience, MEA, 40 comprises a polymer electrolyte membrane (PEM) 43 having first and second side portions 41 and 45 respectively, and at least one electrode 44 operatively connected to the PEM, for example by pressing the two components together. By way of example and not of limitation, the at least one electrode is formed of a conductive material such as a catalyst ink and carbon paper. In an embodiment of the present invention, an electrode 44 is pressed onto each of the side portions 41, 45 of the PEM and are operatively connected thereto. Juxtaposed perforated current collectors 46, 48 formed of a suitable metallic material or alloy, are positioned on and operatively connected to each side of the PEM encapsulating it in a sandwich-like structure. One current collector serves as a cathode 46 and the other as an anode 48 in the DAFC.

Fuel Cell Assembly

Figure 2:
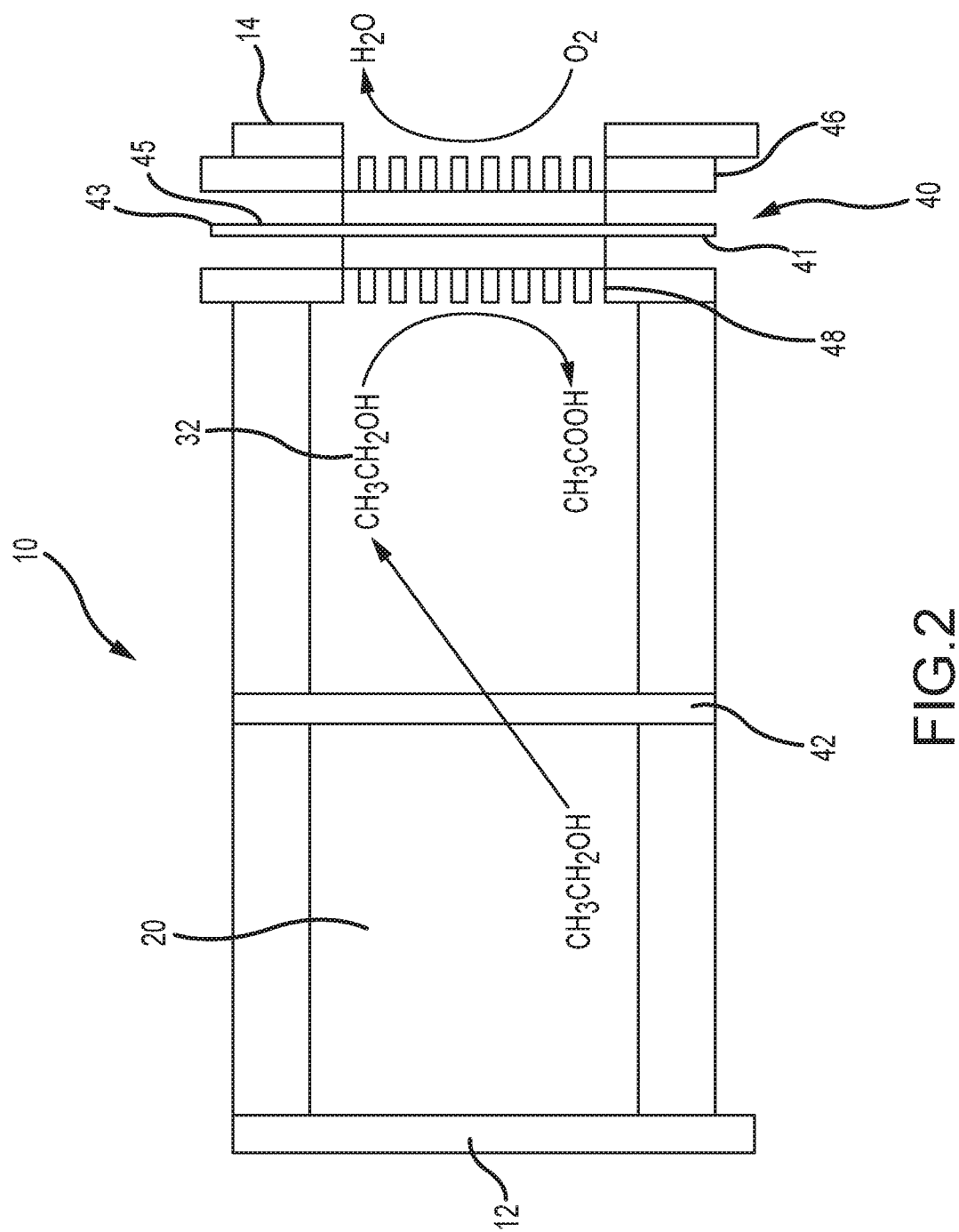
FIG. 2 is a side sectional elevation view of the hybrid, integrated dual chamber fuel cell of FIG. 1.

The construction of a direct alcohol fuel cell (DAFC) 10 in accordance with an embodiment of the present invention as shown in FIGS. 1 and 2 entails the use of off the shelf cathodes 46 and anodes 48 manufactured by Alfa Aesar in the as received condition. To form the PEM 43, an initial procedure used Nafion 115 manufactured by Fuel Cells Etc. which was cut into 17.6 cm$^2$ sheets and activated by boiling in deionized water, 3.0 weight % $H_2O_2$, deionized water, and 0.50 M $H_2SO_4$ each for 1 hour. Anodes and cathodes were hot-pressed at 1,800 kg for 3 minutes at 130° C., using activated Nafion 115 as a separator to produce MEAs with an electrode area of 5.3 cm$^2$.

Standard fuel cells, by way of example and not of limitation, a DAFC, were assembled by sandwiching the MEA between two perforated titanium current collectors 46, 48 (635 μm thick), each having a preselected total surface area and including a plurality of apertures having a preselected size or diameter of approximately 1.6 mm formed therein, the plurality of apertures being structured and arranged to collectively create a total open area of a preselected size. An exemplary total open area is approximately 35% to approximately 65% of the respective collector's surface area in contact with the electrode. However other surface areas may be used without departing from the scope hereof. The standard fuel cell further includes the anode chamber 30 including DEFC reservoir 32 and slotted cathode end plate 14, to allow air exposure, using silicone rubber gaskets as seals (not shown). Membrane-integrated hybrid fuel cells were assembled in a similar fashion but with the additional fermentation chamber 20 separated from the DAFC anode chamber or fuel reservoir using separation membranes 42. With membrane-integrated fuel cells, the terms "anode chamber" and "DAFC/DMFC/DEFC chamber" are used synonymously, depending upon the use of methanol, ethanol or referring to alcohol generally. Separation membranes from Sepro Membranes, Inc. were used as received.

Apparatus and Process Verification

Fouling in Standard Fuel Cells

To demonstrate MEA fouling when fermentation broth is used as a fuel source, a broth containing a yeast extract peptone dextrose (YPD) broth and an additional 2.0% glucose by weight, making a total of 6.0% sugar by weight, was made with store-bought baker's yeast. The fermentation process was allowed to proceed overnight (approximately 14-16 hours) at room temperature to allow conversion of sugar to alcohol. To evaluate the fouling potential of this broth, several experiments were performed with regular DEFCs. Four DEFCs using a 2.0 weight % ethanol in deionized water feed were tested and the peak power density was measured using constant load discharge technique to establish a baseline. Cells were discharged at 1 k, 100, 50, 20, 10, 7.3, 5.3, 4.3, 3.3, 2.3, 1.3, and 0.3Ω and the plateau voltage, which is typically achieved at 15, 10, 10, 5, 3, 3, 3, 3, 3, 1.5, 1.5, and 1 minute, respectively, was used to calculate the power. Subsequently, fermentation broth was pressure filtered through a stirred filtration cell (Amicon) using microfiltration (MF), ultrafiltration (UF), and reverse osmosis (RO) membranes (Sepro Membranes, Inc.) and introduced into each DEFC used to establish baseline performance. After soaking in the fermentation filtrate, the DEFCs were rinsed with deionized water, and 2.0 weight % ethanol in deionized water was then used as the fuel to test the extent of fouling by comparing the power density of each cell before and after fermentation filtrate exposure.

MEA Fouling in Membrane-Integrated Fuel Cells from Fermentation Broth

To establish fouling resistance conferred by diffusion driven separation, initial tests used membrane-integrated fuel cells which were assembled with polyethersulfone microfiltration (0.2 μm) and ultrafiltration (0.03 μm) membranes and polyamide nanofiltration (NF) and RO (SW30HR) membranes (Sterlitech Corp.) between the fermentation broth and glucose solution. Fermentation broth, containing YPD broth and an additional 4.0% glucose by weight, making a total of 8.0% sugar by weight, was made with store-bought baker's yeast and allowed to ferment overnight at room temperature before adding to the MFC/fermentation chamber. 4.0 weight % glucose in deionized water was added to the anode chamber. It should be noted that at these sugar concentrations, most of the sugar is converted to ethanol after fermenting overnight. Hence, glucose in the anode chamber is only needed to balance the osmotic pressure created by nutrients in the fermentation broth contained in the MFC/fermentation chamber.

As will be discussed in greater detail below, to further verify the operation of a biohybrid fuel cell in accordance with the present invention, a standard polyamide based thin-film composite RO membrane was used to separate the MFC/fermentation and DEFC chambers in an RO-integrated hybrid fuel cell shown in FIG. 2. To demonstrate the osmotic balance using glucose in the anode chamber, Nafion 115 (Fuel Cells Etc.) was cut into 4.0 cm×4.4 cm sheets and activated by rinsing with deionized water, soaking in ethanol for 30 minutes, and boiling in 1 M $H_2SO_4$ for 1 hour. After rinsing with deionized water, direct methanol fuel cell (DMFC) anodes and cathodes (Alfa Aesar) were used as received and anodes and cathodes (electrodes, 44, on sides 41 and 45, respectively) were hot-pressed at 1,800 kg for 3 minutes at 130° C., using activated Nafion 115 as a separator to produce membrane electrode assemblies (MEAs) with an electrode area of 5.3 cm2. Two hybrid DEFCs were assembled using the freshly prepared MEAs, each sandwiched between two perforated titanium current collectors. The DEFC chambers and fuel chambers were separated using reverse osmosis (SW30HR) membranes 42 (Sterlitech Corp.), and deionized water was added to the DEFC chamber of one fuel cell, while 12.5 weight % glucose in deionized water was added to the DEFC chamber of a second fuel cell. 12.5 weight % ethanol in deionized water was added to the fuel chamber of each hybrid DEFC, and the liquid level of each DEFC chamber was monitored with time. After 16.5 hours, power curves were obtained by discharging each hybrid DEFC in air at 1 k, 100, 50, 20, 10, 7.3, 5.3, 4.3, 3.3, 2.3, 1.3, and 0.3Ω and for 15, 10, 10, 5, 3, 3, 3, 3, 3, 1.5, 1.5, and 1 minute, respectively, at room temperature using a VMP2 potentiostat (BioLogic). It should be noted that not all of the MEAs were conditioned, and, therefore, power densities obtained were not optimal.

To demonstrate ethanol diffusion in the biohybrid DEFC, 6.0 weight % glucose in deionized water was added to the anode chamber of the biohybrid DEFC to balance the osmotic pressure in the MFC/fermentation chamber. Ethanol was generated in the MFC/fermentation chamber by allowing 2.0 weight % sugar to ferment for 1 day in a broth of 2.0 weight % baker's yeast in M9 growth medium, before adding to the MFC/fermentation chamber. Preparation of the M9 medium is known in the art, but, briefly, M9 growth medium was prepared as follows: 3 g $KH_2PO_4$, 6 g $Na_2HPO_4$, 5 g NaCl, and 1 mL of 1 M $MgSO_4$ were dissolved in deionized water to make 1 L of solution. The DEFC was held at open circuit (i.e., no electrical load) to avoid the consumption of ethanol. Samples from the glucose solution in the anode chamber were periodically analyzed for ethanol and glucose concentrations using high-performance liquid chromatography (HPLC).

Results

Fouling from Fermentation Broth in Standard Direct Ethanol Fuel Cells

Figure 3A:
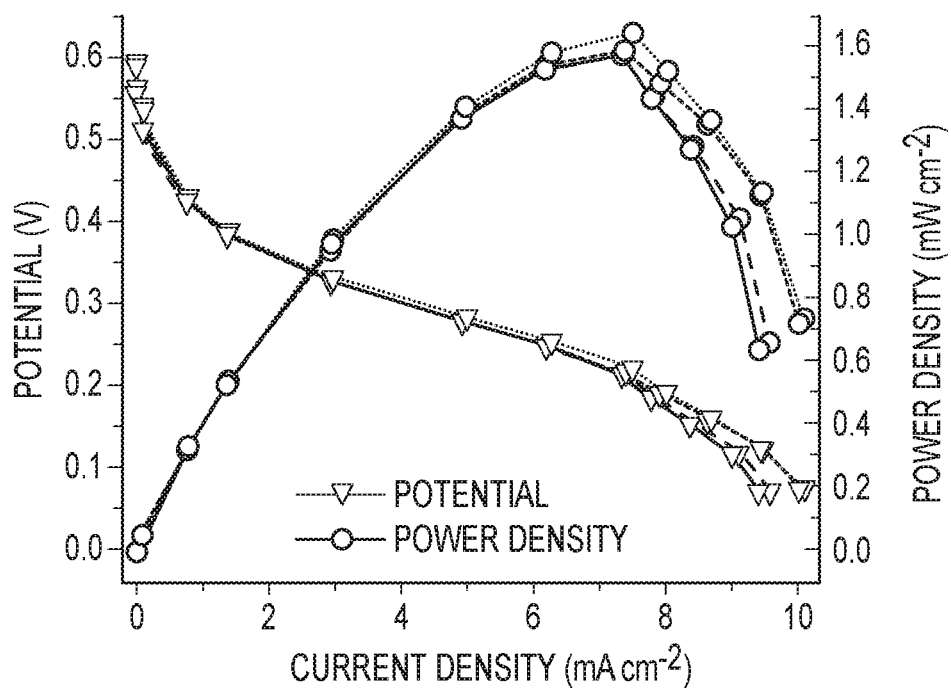
FIG. 3.A. is a graphical presentation of the potential and power density measurements of several standard DEFCs at room temperature showing consistent performance using 2.0 weight % ethanol as fuel.
Figure 3B:
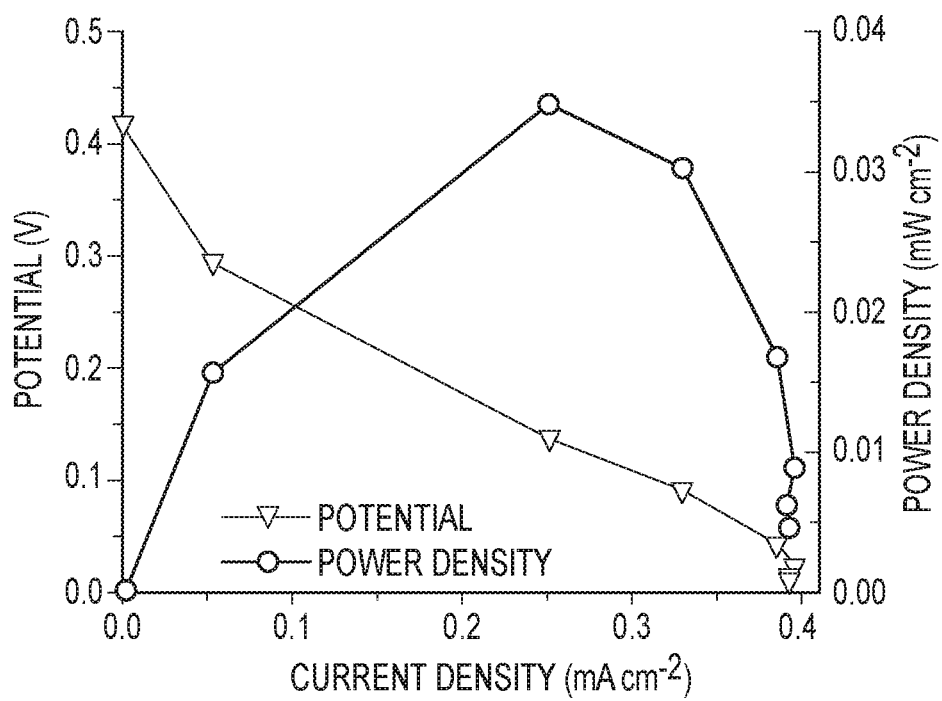

To establish a baseline for fuel cell performance, four DEFCs using a 2.0% by weight ethanol in deionized water feed were tested, and an average peak power 1.6 mW $cm^2$ was achieved. These results are depicted graphically in FIG. 3.A. which presents the results graphically thus establishing a consistent baseline. After introducing the fermentation broth filtrate to the DEFCs for 48 hours and rinsing with deionized water, the peak power generated by fresh 2.0 weight % aqueous ethanol fuel was measured. Table 1 shows the relative power, which is the ratio of the peak power before and after fermentation broth filtrate exposure, after 48 hours of contact with fermented broth filtered through various membranes. It is apparent that power loss due to fouling decreases as the pore size of the membrane used to filter the fermentation broth decreases, and only a minimal loss is observed when the fermentation broth is filtered using a RO membrane.

TABLE 1

| Membrane | Relative Power ($P/P_0$) |
|---|---|
| None | 7% |
| Microfiltration | 38% |
| Ultrafiltration | 80% |
| Reverse Osmosis | 93% |

An evaluation of fermentation broth components for deterioration of fuel cell performance was started previously (Mackie et al., 2013). In that work, buffer components and salts in minimal media, such as yeast nitrogen base and M9 growth media, were evaluated and shown to hinder fuel cell performance, but these effects were reversible. The YPD was evaluated for this work and it was shown that yeast extract had similar, deleterious, but reversible effects. However, peptones (i.e., hydrolyzed proteins) not only severely impeded fuel cell performance, but recovery required very extensive cleaning procedures. By way of example and not of limitation, FIG. 3.6 illustrates graphically a power output degradation by a factor in excess of 2 when using a full growth medium without filtration.

Ethanol Diffusion and RO-Integrated Hybrid Fuel Cell Performance

Figure 4:
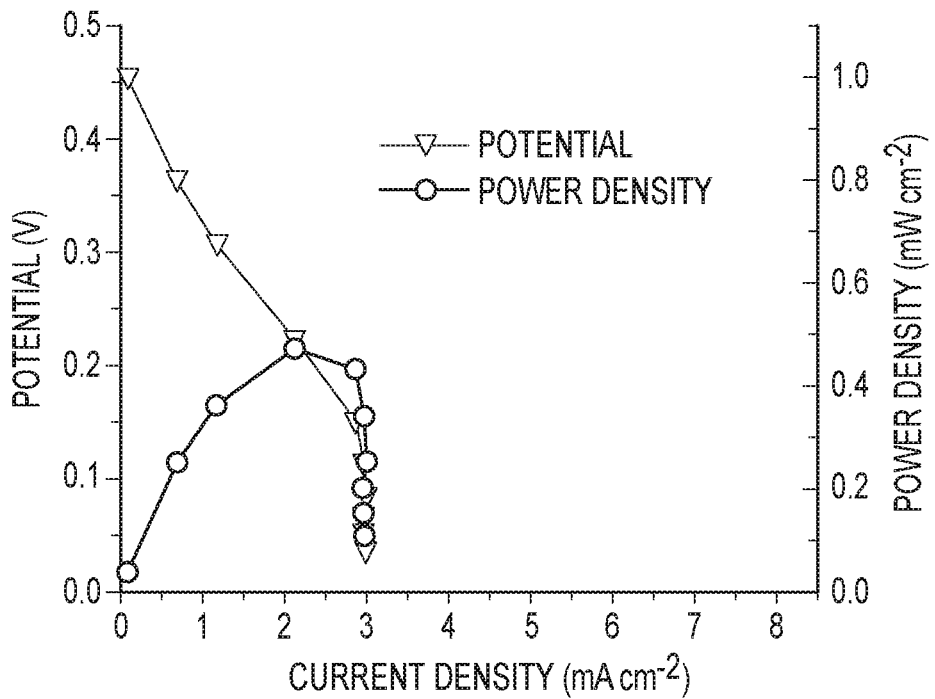
FIG. 4 is a graphical presentation of the potential and power density profiles of a hybrid DEFC with water following the addition 12.5 weight % ethanol to the fuel chamber and a 16.5 hour equilibration period.
Figure 5:
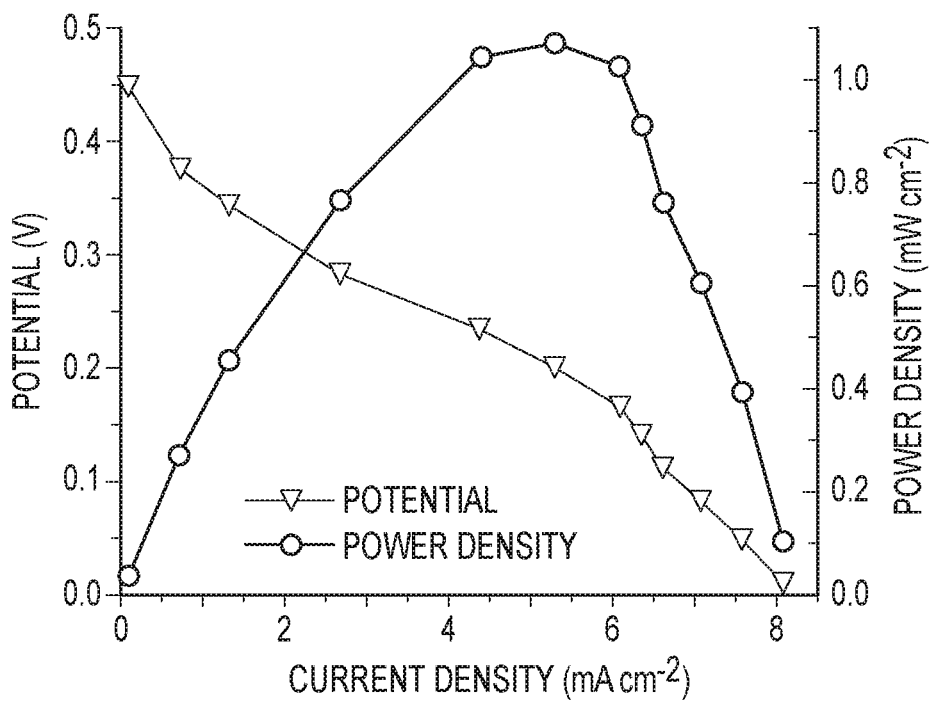
FIG. 5 is a graphical presentation of the potential and power density profiles of a hybrid DEFC with a glucose solution following the addition of 12.5 weight % ethanol to the fuel chamber and a 16.5 hour equilibration period.

FIGS. 4 and 5 show the hybrid DEFC potential and power density profiles 16.5 hours after the addition of fuel to the fuel chamber and water (FIG. 4) and 16.5 hours after the addition of 12.5 weight % glucose (FIG. 5) to DEFC chamber. After 25.7 hours, the hybrid DEFC with water in the DEFC chamber has lost approximately 70% of its volume to the fuel chamber, and the fuel chamber overflows due to the osmotic pressure exerted by the 12.5 weight % ethanol solution in the fuel chamber. On the other hand, the hybrid DEFC with 12.5 weight % glucose in the DEFC chamber loses approximately 5% of its volume, presumably via crossover through the MEA separator (FIG. 5). It is apparent that water loss from the DEFC chamber is mitigated by balancing the osmotic pressure using glucose.

When only water is added to the DEFC chamber, the hybrid DEFC generates a peak power density of 0.47 mW $cm^2$ at a load of 20Ω (FIG. 4). On the other hand, the hybrid DEFC with 12.5 weight c/o glucose in the DEFC chamber generates a power density 1.1 mW $cm^2$ at a load of 7.3Ω (FIG. 5). The lower power density generated by the hybrid DEFC without glucose in the DEFC chamber is presumably due to the loss of contact area with the anode catalyst. When combined with the volume loss in the DEFC chamber with only water, the power density data suggest that the hybrid DEFC is not a practical system for converting biomass (i.e., sugar in the MFC/fermentation chamber) to electricity without the addition of an osmotic balancer (by way of example, and not of limitation, glucose in one embodiment) in the DEFC chamber, since the osmotic pressure would be even greater with fermenting biomass. However, it is to be understood that other materials may not be used for osmotic balancing without departing from the scope of the present invention.

Figure 6:
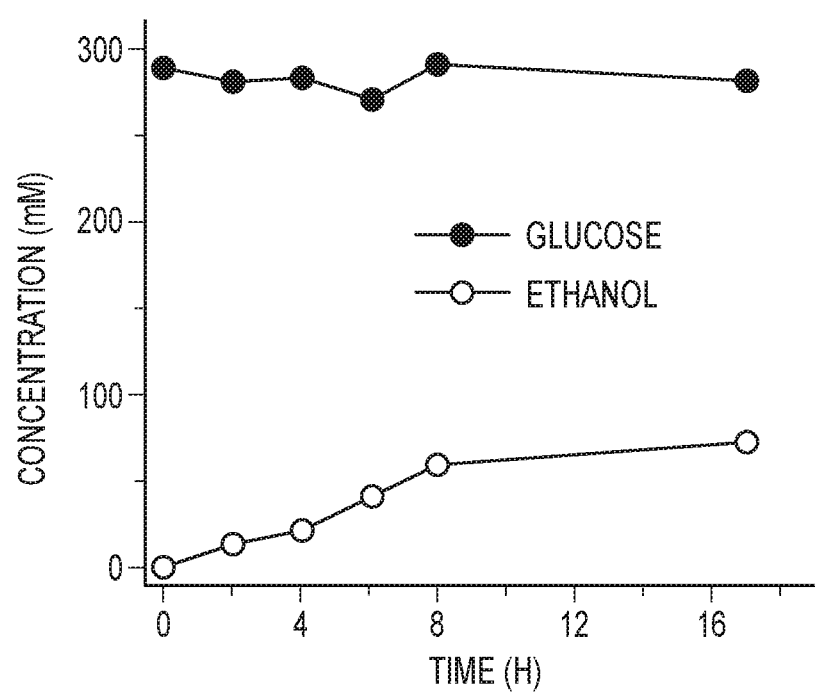
FIG. 6 is a graphical presentation of the glucose and ethanol solution percentages in an anode chamber of a biohybrid DEFC in accordance with an embodiment.

FIG. 6 shows the concentration of glucose and ethanol in millimolar (mM) concentration units in the DEFC chamber as a function of time. It should be noted that in all figures, lines are drawn to guide the eye. The 6.0 weight % glucose solution in the anode chamber was observed to osmotically balance the fermentation broth containing 2.0 weight % sugar and other nutrients needed for yeast growth. However, a preselected amount of glucose in the anode chamber in a range of approximately 4% to approximately 15% by weight according to the composition of the contents of the fermentation chamber has proven adequate for purposes of osmotic balancing. It can be seen in FIG. 6 that glucose concentration in the anode chamber is constant with time, as RO membranes are essentially impermeable to molecules as large as glucose for this experiment. Ethanol, however, clearly diffuses to the anode chamber and its concentration in the anode chamber plateaus after about 16 hours.

RO-Integrated Biohybrid Fuel Cell Performance Using Fermented Crushed Grapes

Figure 7A:
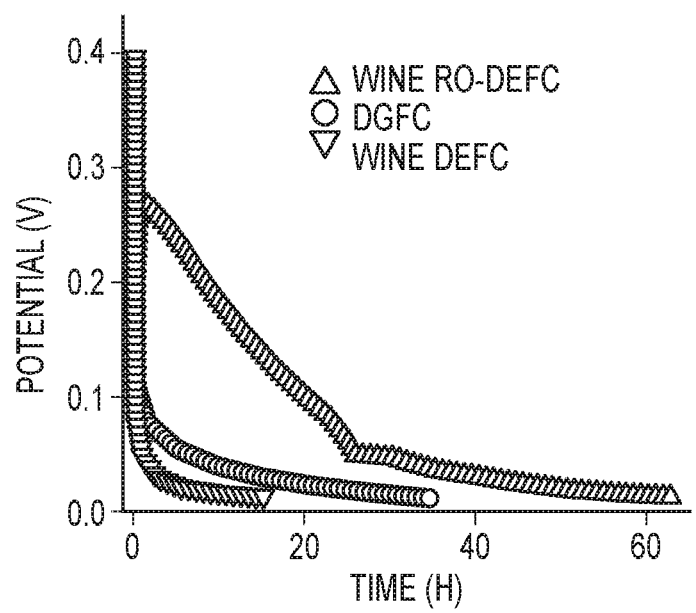
FIG. 7.A. compares the discharge profiles of a DEFC and a biohybrid DEFC using fermented grape (wine) to illustrate the differences in their respective performances and a DGFC as a control.
Figure 7B:
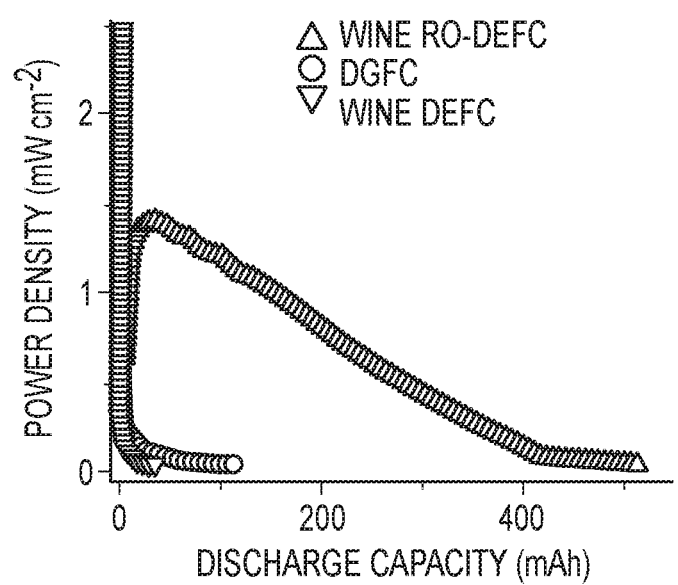

Power generation from crushed grapes fermented by *Saccharomyces cerevisiae* was investigated to test direct biomass-to-electricity conversion. Fermented biomass containing ~13% alcohol by volume (abv) was introduced into the MFC/fermentation chamber, and 6.0 weight % glucose was added to the DEFC chamber. FIG. 7.A shows the discharge profile of the grape-fermentation RO-integrated biohybrid fuel cell (or wine biohybrid DEFC) discharged at 10Ω. Ethanol diffusion from the MFC/fermentation chamber to the anode chamber is evident in the increase in potential after ~10 minutes into the discharge. To resolve the uncertainty of the contribution of glucose in the anode chamber of the wine biohybrid DEFC to the performance, the discharge profile of direct glucose fuel cell DGFC is also plotted. The DEFC consisting of 6 weight % glucose in ~13% abv fermented wine, which shows the contribution of ethanol oxidation in the absence of diffusion-driven purification, generates little power. FIG. 7.B clearly shows the advantage of the biohybrid DEFC over standard DEFCs. The wine biohybrid DEFC generates a peak power of 1.38 mW $cm^{-2}$, which is the highest reported thus far for direct biomass-toelectricity conversion for PEM fuel cells. On the other hand, the DGFC and wine DEFC do not produce any practical power when discharged under identical conditions.

When compared to the standard wine DEFC the discharge capacity and discharge energy of the wine biohybrid DEFC are approximately 14 times and 60 times greater, respectively, which shows the effectiveness of the system at rejecting foulants from the dirty fuel while allowing ethanol to diffuse into the anode chamber. It may be seen that the standard DEFC does not produce practical power because the MEA quickly fouls. The data show that 1) glucose in the anode chamber solution of the RO-integrated wine biohybrid DEFC does not contribute to the overall power or discharge energy, and 2) unfiltered wine does not produce as high of a power density or discharge capacity as the RO-integrated wine biohybrid DEFC due to MEA fouling in the absence of the diffusion-driven separation enabled by the RO membrane.

Glucose was chosen as the solute for osmotic balance because it is relatively inert and salts are known to reduce PEM performance through ion exchange with protons in the PEM15. A drawback with glucose is its crossover through the PEM. In all fuel cells tested, a buildup of matter is observed at the air electrode (cathode), typically after a day of operation. This is not apparent when using aqueous ethanol as fuel, but with glucose and fermented sugars, a buildup of a viscous substance (possibly glucose) is observed on the cathode surface due to crossover of this substance through the MEA separator. Nevertheless, the rate of ethanol diffusion using the glucose solutions noted above is sufficient for generating practical levels of power, while allowing adequate separation of foulants from dirty biofuel.

The mitigation of fuel crossover effected by the reduced mass transfer across the RO membrane in RO-integrated hybrid fuel cells is applicable to other fuel cell systems. Preliminary results show that the mechanism is also effective in reducing crossover in passive DMFCs, enabling compact, hand-held fuel cells with high energy densities.

The novel biohybrid fuel cell which couples a DEFC to a living fermentation process to generate electricity from fermented sugars demonstrates that the energy burden of the integrated purification and controlled fuel delivery is paid by yeast, which creates the ethanol concentration gradient that drives diffusion across the RO separator. This scheme for coupling biochemical reactions directly to DEFCs enables high energy yields and practical power densities from fermentation processes compared to traditional biomass-to-energy approaches, and may be applied to the direct coupling of any microbial metabolic product that can be used as fuel in traditional fuel cells.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A hybrid, integrated, dual-chamber fuel cell, comprising:
    a direct alcohol fuel cell (DAFC) having an anode chamber, the anode chamber including a fuel reservoir, an osmotic balancer and a membrane electrode assembly (MEA) positioned therein, the membrane electrode assembly including a polymer electrolyte membrane (PEM) having a first side portion and a second side portion;
    a first electrode operatively connected to the first side portion of the membrane electrode assembly;
    a second electrode operatively connected to the second side portion of the membrane electrode assembly;
    a first current collector having a surface area, the first current collector being positioned on and operatively connected to the first side of the polymer electrolyte membrane;
    a second current collector having a surface area, the second current collector being positioned on and operatively connected to the second side of the polymer electrolyte membrane; the first and second current collectors cooperating with one another to form a sandwich-like structure whereby the polymer electrolyte membrane is encapsulated therein;
    a fermentation chamber operatively connected to the fuel reservoir positioned in the anode chamber of the DAFC;
    an impure unprocessed biomass fuel source located in the fermentation chamber; the impure unprocessed biomass fuel source being adapted to be converted within the fermentation chamber into a fermentation broth comprising an alcohol and foulants; and
    a reverse osmosis membrane disposed intermediate the fermentation chamber in a microbial fuel cell and the anode chamber in the direct alcohol fuel cell.

2. The hybrid, integrated, dual-chamber fuel cell of claim 1 wherein the direct alcohol fuel cell comprises a direct ethanol fuel cell (DEFC).

3. The hybrid, integrated, dual-chamber fuel cell of claim 1 wherein the alcohol comprises pure fermented ethanol.

4. The fuel cell of claim 1 wherein the first current collector is the cathode of the membrane electrode assembly and the second current collector is the anode of the membrane electrode assembly.

5. The fuel cell of claim 4 wherein each of the first and second current collectors comprises a metal alloy.

6. The fuel cell of claim 5 wherein the metal alloy comprises titanium.

7. The fuel cell of claim 4 wherein each of the first and the second current collectors has a preselected surface area and includes a plurality of apertures formed therein, the plurality of apertures collectively having an open area of a preselected size.

8. The fuel cell of claim 7 wherein the open area formed in each of the first and the second current collectors is approximately 35% to approximately 65% of the respective current collector's surface area.

9. The fuel cell of claim 8 wherein the unprocessed biomass fuel source comprises a yeast extract peptone dextrose (YPD) broth and a preselected amount of glucose.

10. The fuel cell of claim 9 wherein the preselected amount of glucose is approximately 2% to approximately 4% by weight.

11. The fuel cell of claim 1 further including a housing having a pair of oppositely disposed end plates, one of the pair of end plates comprising a slotted cathode end plate adapted to provide air exposure to the anode chamber.

12. The fuel cell of claim 1 wherein the first and second electrodes comprise carbon paper and a catalyst ink.

13. The fuel cell of claim 1 wherein the osmotic balancer comprises a preselected quantity of glucose.

14. The fuel cell of claim 13 wherein the preselected quantity of glucose is in a range of 4% to 15% by weight.

15. A method for generating electrical power from an unprocessed biomass fuel source using a biohybrid fuel cell, the biohybrid fuel cell including a microbial fuel cell having a MFC/fermentation chamber adapted to produce a clean fuel from the unprocessed biomass fuel source; a direct alcohol fuel cell operatively connected to the microbial fuel cell, the direct alcohol fuel cell including an anode chamber, which is adapted to receive the clean fuel from the MFC/fermentation chamber; a separation barrier disposed intermediate the MFC/fermentation chamber in the microbial fuel cell and the anode chamber in the direct alcohol fuel cell; and a membrane electrode assembly positioned in the anode chamber; the method comprising:

preparing a fermentation broth from the unprocessed biomass fuel source, whereby the broth includes complex microbial consortia which may be converted;

fermenting the broth at room temperature for approximately 14 to approximately 16 hours;

adding the fermentation broth to the MFC/fermentation chamber in the microbial fuel cell;

adding a preselected amount of glucose and deionized water to the anode chamber whereby the MFC/fermentation chamber and the anode chamber are osmotically balanced with respect to one another across the separation barrier;

generating a clean fuel in the MFC/fermentation chamber;

diffusing the clean fuel from the MFC/fermentation chamber across the separation barrier into the anode chamber;

and oxidizing the clean fuel in the anode chamber to produce electrical power at a selected output level.

16. The method of claim 15 further including maintaining the power output level by preventing the diffusion of foulants generated in the MFC/fermentation chamber across the separation barrier into the anode chamber.

17. The method of claim 16 further including preventing oxidation by-products of the reaction process in the anode chamber from returning across the separation barrier into the MFC/fermentation chamber.

18. The method of claim 15 wherein the preselected amount of glucose in the anode chamber in the step of osmotic balancing comprises approximately 4% to approximately 15% by weight, according to the composition of the contents of the MFC/fermentation chamber.

19. The method of claim 15 wherein the fermentation broth includes fermented biomass derived from crushed grapes.

20. The method of claim 19 further including the step of adding approximately 6.0% weight percent alcohol to the anode chamber.

21. The method of claim 15 wherein the unprocessed biomass fuel source contains complex sugars and wherein the fermentation broth further contains catalytic systems capable of converting complex sugars into simple sugars that can be fermented to alcohol.

* * * * *